United States Patent
Johnston et al.

(10) Patent No.: US 7,508,931 B2
(45) Date of Patent: Mar. 24, 2009

(54) METHOD FOR DETECTING ECHO PATH CHANGES IN ECHO CANCELLERS

(75) Inventors: Renee Johnston, Dunrobin (CA); Mirjana Popovic, Ottawa (CA); Dieter Schulz, Dunrobin (CA); Jan Radecki, Ottawa (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 473 days.

(21) Appl. No.: 11/045,743

(22) Filed: Jan. 27, 2005

(65) Prior Publication Data
US 2005/0169457 A1    Aug. 4, 2005

(30) Foreign Application Priority Data
Jan. 30, 2004    (GB)    .................... 0402102.8

(51) Int. Cl.
H04M 9/08    (2006.01)
(52) U.S. Cl. ................................. 379/406.08
(58) Field of Classification Search .......... 376/406.01–406.16; 381/93, 94.1, 94.3, 66; 379/406.08
See application file for complete search history.

(56) References Cited
U.S. PATENT DOCUMENTS

| | | |
|---|---|---|
| 5,745,564 A | 4/1998 | Meek |
| 6,035,034 A | 3/2000 | Trump |
| 6,226,380 B1 | 5/2001 | Kanata |
| 6,369,757 B1 * | 4/2002 | Song et al. .................... 342/378 |
| 2002/0064139 A1 * | 5/2002 | Bist et al. .................... 370/289 |
| 2002/0126834 A1 | 9/2002 | Seibert |

FOREIGN PATENT DOCUMENTS

JP    05304493 A    11/1993

OTHER PUBLICATIONS

Catharina Carlemalm & Andrew Logothetis, On Detection of Double Talk and Changes In The Echo Path Using a Markov Modulated Channel Model, 1997, p. 3869-3872.

* cited by examiner

Primary Examiner—Alexander Jamal

(57) ABSTRACT

A method for detecting echo path changes in an echo canceller using the statistics of the echo canceling behavior (i.e. signal and performance information), to distinguish between new line and double talk conditions. A moving counter is incremented or decremented based on monitored levels of ERL (Echo Return Loss), ERLE (Echo Return Loss Enhancement), noise and signal energies. When the counter reaches a predetermined threshold value indicative of sustained poor echo cancellation performance, a determination is made that there is a probable new line condition (i.e. echo path change). This echo path change information is then passed to the echo canceller to enable re-convergence.

4 Claims, 3 Drawing Sheets

METHOD FOR DETECTING ECHO PATH CHANGES IN ECHO CANCELLERS

FIELD OF THE INVENTION

The present invention relates generally to detection of echo path changes in echo cancellers, and more particularly to a method of monitoring echo canceling behavior, to distinguish between new line and double talk conditions, and thereby detect echo path changes in echo cancellers.

BACKGROUND OF THE INVENTION

The signal path between two telephones, involving a call other than a local one, requires amplification using a four-wire circuit. The cost and cabling required discourages extending a four-wire circuit to a subscriber's premises from the local exchange. For this reason, the four-wire trunk circuits are coupled to two-wire local circuits, using a device called a hybrid.

Hybrid echo, the primary source of echo generated from the public-switched telephone network (PSTN) is created as voice signals are transmitted across the network via the hybrid connection at the two-wire/four-wire PSTN conversion points.

Unfortunately, the hybrid is by nature a leaky device. As voice signals pass from the four-wire to the two-wire portion of the network, the energy in the four-wire section is reflected back, creating an echo of the speech signal. Provided that the total round-trip delay occurs within just a few milliseconds, the echo results in a user perception that the call is 'live' by adding sidetone, thereby making a positive contribution to the quality of the call.

In cases where the total network delay exceeds 36 ms, however, the positive benefits disappear, and intrusive echo results. The actual amount of signal that is reflected back depends on how well the balance circuit of the hybrid matches the two-wire line. In the vast majority of cases, the match is poor, resulting in a considerable level of signal being reflected back.

The effective removal of hybrid echo is one key to maintaining and improving perceived voice quality on a call. This has led to intensive research into the area of echo cancellation, with the aim of providing solutions that can reduce echo from hybrids. By employing the results of this research, the overall speech quality is improved significantly.

It is known in the art to employ adaptive filtering to address hybrid echo cancellation. In an adaptive filter, the filter coefficients are based, in part, on feedback of filter output. Normalized Least Mean Square (NLMS) adaptive filtering is one method, popular in echo cancellation, to address reflections in the telephony system.

In such echo cancellers, the coefficients of an adaptive filter converge to a certain echo path. Under ideal conditions, a generally acceptable convergence time requires that the echo canceller achieve 27 dB of ERLE (Echo Return Loss Enhancement) in 0.5 sec. Once the coefficients are converged, the echo is canceled from the input signal. When the echo path changes (i.e. call transfer, conferencing), the echo canceller has to quickly re-converge to the new echo path or else the echo will be perceived by the user. Detecting line changes is a difficult problem since the echo resulting from a new hybrid in a changed echo path and the echo generated by the old hybrid from the converged adaptive filter can easily be confused as a double talk signal.

Prior art solutions to this problem may be found in U.S. Pat. No. 6,035,034 (Trump, Tonu): Double talk and Echo Path Change Detection in a Telephony System, and U.S. Pat. No. 6,226,380 (Heping, Ding): Method of Distinguishing Between Echo Path Change and Double Talk Conditions in an Echo Canceller.

SUMMARY OF THE INVENTION

According to the present invention, there is provided a method for detecting echo path changes in an echo canceller that uses the statistics of the echo canceling behavior (i.e. signal and performance information), to distinguish between new line and double talk conditions. In terms of speech dynamics, double talk conditions are relatively short in duration, whereas a new line condition remains active. Using a moving counter (referred to herein as an Echo Path Change Counter or EPC Counter), an evaluation is made of the probability that the echo canceller behavior is responding to an echo path change and not a double talk scenario. By monitoring the ERL (Echo Return Loss), ERLE (Echo Return Loss Enhancement), noise levels and signal energies, the Echo Path Change Counter is incremented or decremented. When the counter reaches a predetermined threshold value indicative of sustained poor echo performance, a determination is made that there is a probable new line condition. This echo path change information is then passed to the echo canceller to enable re-convergence.

BRIEF DESCRIPTION OF THE DRAWINGS

An embodiment of the present invention will now be described, by way of example only, with reference to the attached Figures, wherein.

DETAILED DESCRIPTION OF THE INVENTION

Figure 1:
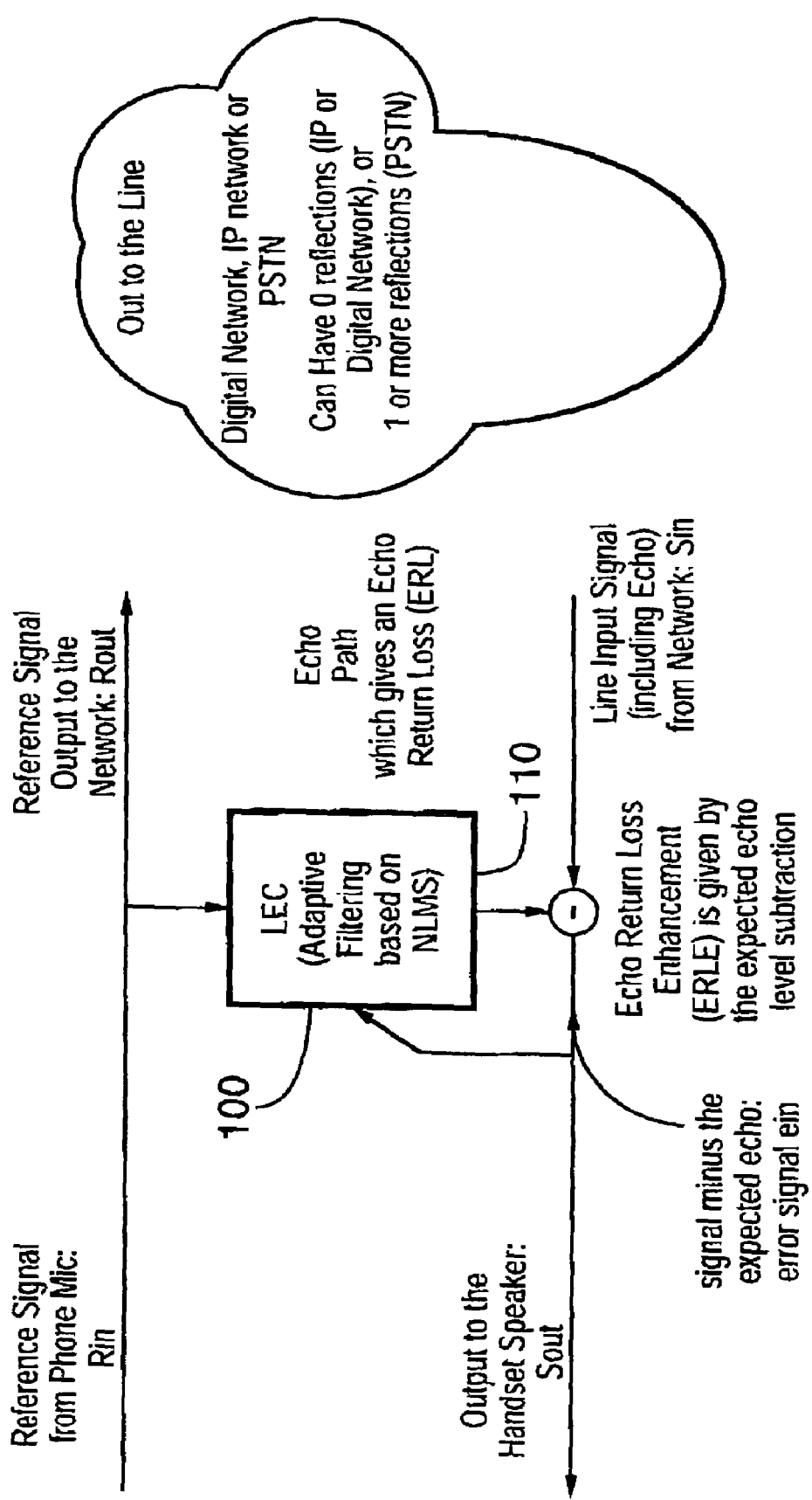
FIG. 1 is a schematic representation an echo canceller according to the present invention.

FIG. 1 shows an adaptive echo canceller according to the prior art. A reference signal (Rin) is applied to an input of echo canceller 100 and to the echo path (i.e. a network echo path resulting from line impedance mismatch) as Rout. The echo path gives rise to an Echo Return Loss (ERL), which is a measure of the actual amount of reflected signal. A high ERL indicates only a relatively small signal reflected back to the talker, and vice versa. The echo canceller 100 models an estimation of the echo introduced by the echo path using the well known NLMS algorithm (although other adaptive algorithms may be used), and subtracts the echo signal from the Line Input Signal (Sin) which contains the undesirable echo, via a subtractor 110. Provided that the transfer function of the model of the echo path provided by echo canceller 100 is identical to the transfer function of the echo path, the error signal becomes zero and the echo canceller 100 converges to the correct transfer function, resulting in perfect echo cancellation. Echo Return Loss Enhancement (ERLE) is given by the expected echo level subtraction, and is an indicator of the amount of echo removed by an echo canceller.

Echo Return Loss Enhancement (ERLE) The ERLE is defined as: $ERLE(dB) = 10\log_{10}[Power(Sin)/Power(Ein)]$.

Figure 2A:
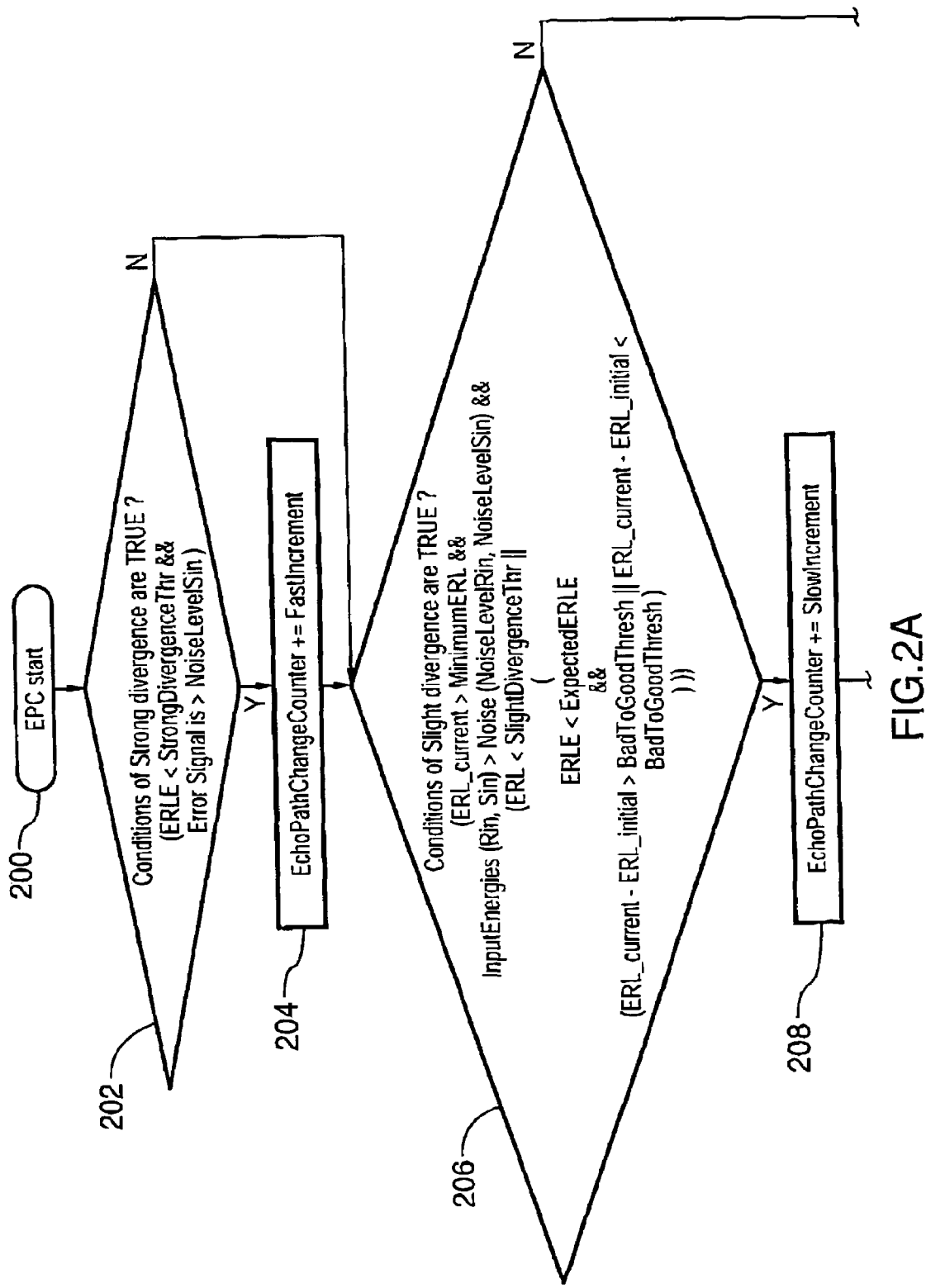
FIG. 2 is a flowchart of a method of detecting echo path changes in operation of the echo canceller of FIG. 1, according to the present invention.
Figure 2B:
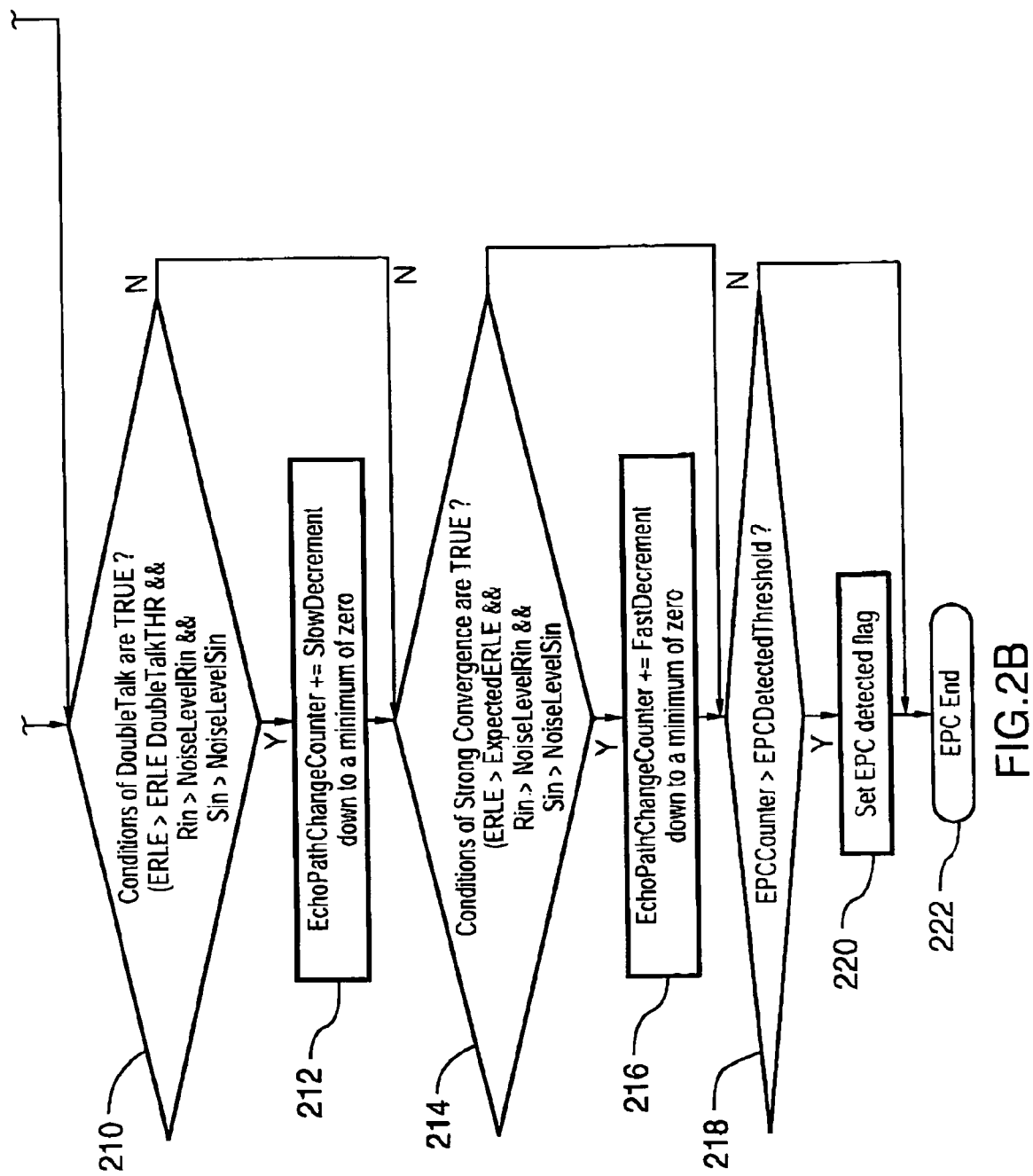

The echo path change detection algorithm of the preferred embodiment is set forth in FIG. 2. Once the echo canceller has converged, the algorithm starts (step 200), whereupon the Echo Path Change Counter is intialized and initial ERL, ERLE, noise levels (NoiseLevelRin and NoiseLevelSin) and signal energies (Rin and Sin) are obtained.

In general, the algorithm according to the present invention monitors ERL and ERLE changes in order to distinguish between double-talk and echo path changes. The moving Echo Path Change counter is incremented or decremented depending on the following conditions:

Area of Strong Divergence (a "Y" Branch from Step 202)

In this state, the algorithm determines with a degree of high confidence that the echo canceller is diverged, and that occurrence of a line change is highly probable. Two conditions are monitored:

a) The ERLE is less than the StrongDivergenceThreshold (typically set at −3 dB). This indicates that the echo canceller adds signal energy, instead of subtracting the echo signal;

b) The energy of error signal (ein) is also monitored to validate that the energy is above the noise level (NoiseLevelSin) calculated on the line input signal.

In this case, the Echo Path Change counter is incremented by a fast_step_increment (—e.g. an increment of 4), at step 204.

Area of Slight Divergence (a "Y" Branch from Step 206)

In this state the algorithm can not determine with high confidence that a new line condition exist. Monitoring the ERLE is not conclusive as changes in the ERLE could also be due to slight double talk or transient effects. Therefore, other tests are performed. The following conditions apply:

a) ERL_current is bigger than a minimum_expected_ERL (where minimum_expected_ERL is the minimum expected ERL of 6 dB given in the G.165 ITU-T standard), indicating the absence of strong double talk;

b) ERLE is less than the SlightDivergenceThreshold (typically set at −1.1 dB) indicating that the echo canceller is adding some signal energy to the near-end+echo signal input (sin) instead of subtracting the echo OR ERLE is smaller than the minimum expected ERLE (value based on the initial ERL) AND the difference between ERL current and ERL initial is bigger/smaller than EPC_GoodToBad_ERL_Threshold (e.g. −6 dB)/EPC_BADtoGood_ERL_Threshold (e.g. 6 dB).

c) The input signal energies (reference (rin) and near-end signal+echo (sin)) are bigger than the respective noise levels. If the signals are close to the noise level, the reliability of the above decisions also drops.

In this case, the Echo Path Change counter is incremented by a slow_step_increment (e.g. an increment of 1), at step 208.

Area of Strong Double Talk (a "Y" Branch from Step 210)

In this state, ERLE indicates that the echo canceller is not well converged, but the reference signal is close to the noise level, thereby indicating a double talk scenario. The following conditions apply:

a) The reference signal is less than the respective noise level;

b) The near-end+echo (sin) is greater than the respective noise level;

c) ERLE is less than the ERLEDoubleTalkThreshold (typically 1.5 dB).

In this case, the Echo Path Change counter is decremented by slow_step_decrement (e.g. a decrement of −1), at step 212.

Area of Strong Convergence (a "Y" Branch from Step 214)

In this state the algorithm determines with a degree of high confidence that the echo canceller is converged and no echo path change has occurred. Two conditions are monitored:

a) ERLE indicates that the echo canceller is well converged;

b) The input signal energies (reference (rin) and near-end+echo (sin)) are greater than their respective noise levels.

In this case, the Echo Path Change counter is decremented by fast_step_decrement (e.g. a decrement of 4), at step 216.

When the EchoPathChangeCounter reaches a Maximum threshold (e.g. 128), indicated by a "Y" branch from step 218, an EchoPathChange (step 220) is indicated and this information is then passed to the echo canceller (step 222).

It will be appreciated that, although embodiments of the invention have been described and illustrated in detail, various modifications and changes may be made. Different implementations may be made by those familiar with the art, without departing from the scope of the invention.

What is claimed is:

1. A method of detecting an echo path chance in an echo canceller having an adaptive filter, comprising:

a) initializing an Echo Path Change Counter;

b) monitoring signal and performance information from said echo canceller indicative of one of either echo canceller convergence or divergence;

c) decrementing said Echo Path Change Counter based on an indication of echo canceller convergence;

d) incrementing said Echo Path Change Counter in response to an indication of echo canceller divergence; and e) indicating said echo Path change in the event said Echo Path Change Counter exceeds a predetermined threshold wherein said monitoring of said signal and performance information includes determining whether ERLE is greater than a minimum expected ERLE value (Expected ERLE) and input signal energies (Rin and Sin) are greater than their respective noise levels, in which case an indication of strong convergence is provided whereupon said Echo Path Change Counter is decremented using a fast decrement.

2. The method of claim 1, wherein said monitoring of said signal and performance information includes determining whether ERLE of the echo canceller is less than a StrongDivergencerhreshold and whether the energy of an error signal (ein) of the echo canceller is greater than the noise level on the line input signal to said echo canceller, in which case an indication of strong divergence is provided whereupon said Echo Path Change Counter is incremented using a fast increment.

3. The method of claim 1, wherein said monitoring of said signal and performance information includes determining whether a current ERL (ERL_current) of the echo canceller is greater than a minimum expected ERL value (minimum_expected_ERL); whether ERLE of said echo canceller is less than a SlightDivergenceThreshold or said ERLE is less than a minimum expected ERLE value (Expected ERLE) and the difference between the current ERL (ERL_current) and ERL initial is greater than a EPC_GoodToBad_ERL_Threshold or less than a EPC_BADtoGood_ERL_Threshold; whether input signal energies to the echo canceller (Rin and Sin) are greater than respective noise levels, in which case an indication of slight divergence is provided whereupon said Echo Path Change Counter is incremented using a slow increment.

4. The method of claim 1, wherein said monitoring of said signal and performance information includes determining whether a reference signal (Rin) to the echo canceller is less than a respective noise level (NoiseLevelRin), whether a near-end input signal (Sin) is greater than a respective noise level (NoiseLevelSin) and whether ERLE is less than a ERLEDoubleTalkThreshold, in which case an indication of double-talk is provided whereupon said Echo Path Change Counter is decremented using a slow decrement. The method of claim 1, wherein said monitoring of said signal and performance information includes determining whether ERLE is greater than a minimum expected ERLE value (Expected ERLE) and input signal energies (Rin and Sin) are greater than their respective noise levels, in which case an indication of strong convergence is provided whereupon said Echo Path Change Counter is decremented using a fast decrement.

* * * * *

UNITED STATES PATENT AND TRADEMARK OFFICE
CERTIFICATE OF CORRECTION

PATENT NO. : 7,508,931 B2  Page 1 of 1
APPLICATION NO. : 11/045743
DATED : March 24, 2009
INVENTOR(S) : Johnston et al.

It is certified that error appears in the above-identified patent and that said Letters Patent is hereby corrected as shown below:

Col. 4, line 4;
In claim 1, line 1, "chance" should be changed to --change--.

Col. 4, line 27;
In claim 2, line 3, "StrongDivergencerhreshold" should be changed to --StrongDivergenceThreshold--.

Col. 4, lines 56-63;
In claim 4, the portion after the period should be deleted.

Signed and Sealed this

Twenty-fifth Day of August, 2009

David J. Kappos
*Director of the United States Patent and Trademark Office*